United States Patent [19]

Hein

[11] 4,413,267

[45] Nov. 1, 1983

[54] INK SUPPLY SYSTEM FOR INK JET PRINTING APPARATUS

[75] Inventor: Richard A. Hein, Rochester, Mich.

[73] Assignee: Centronics Data Computer Corp., Hudson, N.H.

[21] Appl. No.: 332,041

[22] Filed: Dec. 18, 1981

[51] Int. Cl.[3] .................... G01D 15/18

[52] U.S. Cl. .................... 346/75; 346/140 R

[58] Field of Search .................... 346/75, 140 R, 140 IJ; 55/55, 189

[56] References Cited

U.S. PATENT DOCUMENTS

| | | | |
|---|---|---|---|
| 2,172,539 | 9/1939 | Kimmich | 178/13 |
| 3,512,173 | 12/1967 | Damouth | 346/75 |
| 3,708,798 | 1/1973 | Hildenbrand | 346/140 R |
| 3,761,953 | 9/1973 | Helgeson et al. | 346/75 |
| 3,805,276 | 4/1974 | Ishii | 346/140 |
| 3,929,071 | 12/1975 | Cialone et al. | 101/335 |
| 3,930,258 | 12/1975 | Dick et al. | 346/75 |
| 3,953,862 | 4/1976 | Amberntsson et al. | 346/140 R |
| 3,971,039 | 7/1976 | Takano et al. | 346/75 |
| 3,974,508 | 8/1976 | Blumenthal | 346/140 R |
| 4,038,667 | 7/1977 | Hou et al. | 346/140 R |
| 4,067,020 | 1/1978 | Arway | 346/75 |
| 4,079,384 | 5/1978 | Tankano et al. | 346/140 R |
| 4,121,222 | 9/1977 | Diebold et al. | 346/75 |
| 4,123,761 | 10/1978 | Kimura et al. | 346/140 R |
| 4,152,710 | 5/1979 | Matsuba et al. | 346/140 R |
| 4,153,902 | 5/1979 | Kanayama | 346/140 R |
| 4,170,016 | 10/1979 | Geil | 346/140 R |
| 4,187,512 | 2/1980 | Matsunaga et al. | 346/140 R |
| 4,340,895 | 7/1982 | Kikuchi | 346/140 IJ |

*Primary Examiner*—L. T. Hix

*Assistant Examiner*—Todd E. DeBoer

*Attorney, Agent, or Firm*—Kenway & Jenney

[57] ABSTRACT

A recoverable ink supply system, comprising both method and apparatus, includes a primary reservoir which is connected by suitable fluid conduit to a prime, or primary, pump. The prime pump transfers the liquid ink from the primary reservoir to an intermediate reservoir at an increased pressure causing a lower pressure condition in the sealed primary reservoir and a higher pressure condition in the sealed intermediate reservoir. Secondary, or metering pumps, receive pressurized ink from the intermediate reservoir after it is filtered at the reservoir outlet, and supply metered, higher pressure ink through combined filter/pressure fluctuation dampers to associated on/off control valves. The control valves permit the flow of the pressurized ink into the print heads wherefrom the ink is discharged at a controlled uniform velocity. According to known print head technology, a uniform series of ink drops is discharged from the print heads which are either deflected to a recording medium to produce characters or collected by a catcher for recycling to the primary reservoir. Ink recycled to the primary reservoir contains entrapped air, or gas, and the major portion of the entrapped gas is drawn out of the ink in the low pressure reservoir. The remaining gas, both dissolved and undissolved, is carried to the intermediate reservoir wherein the remaining undissolved gases are absorbed in the ink solution due to the high pressure therein. This absorption phenomenon stabilizes the ink and, this stabilized ink is then supplied to the metering pumps before delivery to the print heads.

12 Claims, 1 Drawing Figure

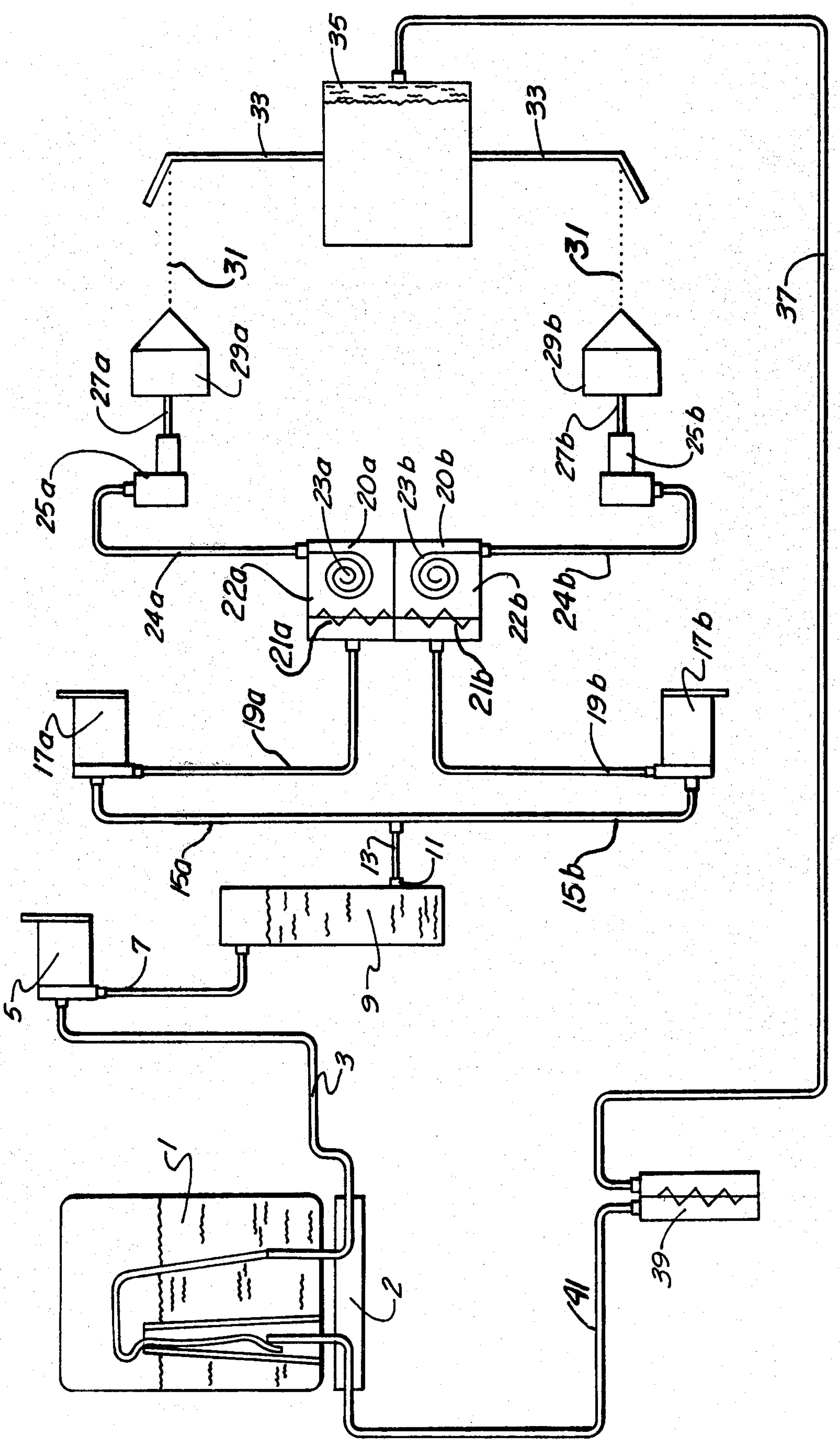
35
33
33
31
31
37
29a
29b
27a
27b
25a
25b
23a
20a
23b
20b
22a
22b
24a
24b
21a
21b
17a
17b
19a
19b
15a
15b
13
11
9
7
5
3
1
2
39
41

INK SUPPLY SYSTEM FOR INK JET PRINTING APPARATUS

BACKGROUND OF THE INVENTION

The present invention, comprising both method and apparatus, relates to liquid ink supply systems for ink jet printers.

In ink jet printers of the continuous ink jet type, one or more print heads discharge a stream of uniformly sized and regularily spaced ink drops. These drops are selectively charged in accordance with an input intelligence signal, and thereafter, are either deposited on a print receiving member or caught and collected by a suitable catcher. In most printing applications the ratio of drops used for printing is small compared to total drops discharged from the print head so that much of the ink passing through the print heads is collected by the catcher. This ink is typically recirculated back to the ink storage reservoir. Inasmuch as this recirculated ink has been exposed to air, however, it is very common for air, or gas, to be entrapped in the recirculated ink. In order to obtain clear printing in an ink jet printer, it is necessary that uniform ink droplets be emitted from the print head(s) at a given frequency. When gas or air is contained in the liquid ink supplied to the metering pump, pump stability is adversly affected, ink drop formation uniformity and frequency at the print head is hampered, and print distortion can result.

There has, therefore, been a long-standing need for ink supply systems which stabilize the air and gas in the ink supply to facilitate the proper formation and discharge of uniform and regular ink drops from the print heads.

Examples of attempts to solve the air bubble problem and other ink supply system problems are shown in U.S. Pat. Nos. 4,153,902; 3,761,953; 3,929,071; 4,079,384; 4,067,020; 3,512,173; 2,172,539; 4,170,016; 4,038,667; 3,974,508; and 3,971,038. Other less pertinent, but related, art is shown in U.S. Pat. Nos. 4,187,512; 4,144,537; 4,123,761; 4,011,157; 4,053,901; 3,953,862; 3,708,798; 3,719,952; 3,798,656; 3,805,276; 3,930,258; 4,048,165, 4,121,222; 4,152,710; 4,176,363, and 3,361,150.

One attempted solution to the air bubble problem has been to provide an air trap, or bubble catcher, which comprises a chamber, vented to the surrounding atmosphere, through which the ink flows prior to arriving at the print head. See U.S. Pat. Nos. 3,929,071; 4,153,902; and 4,079,384 for examples of this approach. This air trap solution to the air bubble problem has proved less than satisfactory in that a significant amount of air or gas is not removed from the ink supply, or stabilized, and distortion of the recorded matter has resulted.

Another problem has been the tendency of some printers to become "unprimed," over time, so that auxiliary priming devices have sometimes been employed. See U.S. Pat. Nos. 4,170,016; 4,038,667; 3,974,508; 4,187,512; and 4,123,761.

Other problems have been an inability to maintain a stable fluid pressure at the print head to ensure uniform, clear characters.

There is, therefore, a need for an ink supply system which stabilizes any air or gas entrapped in the ink, has self-priming capabilities, and maintains stable fluid pressure and desired ink jet velocity at the printhead.

SUMMARY OF THE INVENTION

The present inventive ink supply system, comprising both method and apparatus, overcomes the various problems of the prior art outlined above by providing an ink supply for the print heads in which the presence of air, or gas, in the ink is stabilized, and in which any air remaining in the ink supplied to the print heads has been absorbed in a controlled solution with the ink so that print distortion is minimized.

The invention achieves these objects by providing a low pressure primary reservoir where entrapped air and gas are drawn out of the ink, followed by a higher pressure intermediate reservoir wherein the remaining gas is absorbed in the ink solution in a controlled manner. The intermediate reservoir is followed by a metering pump which increases the pressure of the ink, further stabilizing the ink, prior to delivering it to the print head. As used herein, the term "stable" means that the gas present in the ink has been dissolved therein in a controlled manner so that the metering pump(s) operates in a stable manner, delivering an ink stream to the print heads at a controlled velocity. Air, or gas, not dissolved in the ink could interfere with metering pump performance, and thereby, prevent the pump from delivering ink at the proper velocity and pressure to the print head.

Steady pressure is maintained at the print head by the metering pumps and associated pressure fluctuation dampers.

The invention is also self-priming in that as long as the prime pump or one of the metering pumps is in a primed (no traped air) condition, air will automatically be removed from all other pumps after a period of time in a flow condition. Therefore, the need for auxiliary priming equipment is eliminated.

It is, therefore, an object of the present invention to provide an improved ink supply system for ink jet printers.

It is a further object to provide an ink supply system wherein substantially all of the gas, or air, is removed in a low pressure chamber, while the remaining gas is dissolved in the ink in a higher pressure chamber to provide a stable ink supply.

A still further object is to provide a ink supply system wherein the ink pressure at the print head remains substantially uniform to ensure proper ink jet velocity.

Yet another object is to provide an ink supply system which is self-priming.

Another object is to provide an ink supply system which includes a pressurized reservoir intermediate to primary and secondary pumps.

These and other objects, advantages, and novel features of the present invention will become apparent from the following detailed description of the invention considered together with the accompanying FIGURE.

IN THE FIGURE

The FIGURE is a schematic diagram of the ink supply system of the present invention according to the presently preferred embodiment.

DESCRIPTION OF THE PREFERRED EMBODIMENT

The present invention comprises a recoverable liquid ink supply system for an ink jet printing apparatus.

The inventive system of the present invention includes both a method and apparatus for supplying ink to an ink jet printer and is comprised essentially as follows:

As shown in the FIGURE, the liquid ink supply for the system is provided by a removable and replaceable ink container 1. The ink container 1 is the primary liquid ink reservoir for the system. Primary reservoir 1 is connected through a manifold 2 to a suitable fluid conduit 3, which is, in turn, connected to the prime, or primary, pump 5.

Prime pump 5 is connected by fluid conduit 7 to an intermediate reservoir 9. Intermediate reservoir 9 has a mesh filter 11 at its outlet, and is connected by a fluid conduit 13 to fluid conduits 15*a* and 15*b* as shown. Conduits 15*a* and 15*b* are connected to metering pumps 17*a* and 17*b*, respectively. Pumps 17*a* and 17*b* are connected by respective conduits 19*a* and 19*b* to combined filter/-pressure fluctuation dampers 20*a*, 20*b*. Components 20*a*, 20*b* include fine mesh filters 21*a*, 21*b*, storage chambers 22*a*, 22*b* and coiled capillary tubes 23*a*, 23*b*. Capillary tubes 23*a*, 23*b* are connected by the associated fluid conduits 24*a*, 24*b* to the respective control valves 25*a* and 25*b*. Each of the valves 25*a* and 25*b* is an on/off control valve and is connected by a respective conduit 27*a*, 27*b* to an associated print head 29*a*, 29*b*. Printheads 29*a*, 29*b* discharge a stream of ink drops 31 through their respective orifices (not shown) in accordance with well known technology, not a part of this invention. Further, in accordance with known art, the ink drops 31 are selectively charged by an input intelligence signal and thereafter are either deposited on a print receiving member (not shown) or caught and collected by a suitable catcher, or gutter 33. Note that inasmuch as the invention pertains to an ink supply system, the precise structure of the print head and the manner in which the ink drops are charged and deflected is not a part of the invention, and many suitable structures for accomplishing these purposes are known in the art.

Ink drops 31 collected by catcher 33 are deposited by gravity, or other suitable means, into a captured ink reservoir 35. The captured ink reservoir 35 is connected by a suitable conduit 37 to a particle filter 39. Particle filter 39 is connected through a conduit 41 to a manifold 2 which is, in turn, connected to primary reservoir 1.

Having described the basic structure of present system, its operation is as follows:

Ink is drawn from primary reservoir 1 by the vacuum action of pump 5 acting on conduit 3. Primary reservoir 1 comprises a sealed bottle, or chamber, and thus, a relatively low pressure is generated by pump 5 in reservoir 1 which serves a purpose later described.

Prime pump 5, having drawn ink from the primary reservoir 1, supplies it under pressure through conduit 7 to intermediate reservoir 9. Intermediate reservoir 9 is a sealed chamber which holds ink delivered through inlet conduit 7 under pressure until it is withdrawn through outlet conduit 13. The higher pressure maintained in intermediate reservoir 9 is contrasted with the relatively low pressure maintained in primary reservoir 1, mentioned above. This low pressure/high pressure differential between the reservoirs 1, 9 yields a very significant benefit and comprises a highly innovative concept in ink supply treatment for ink jet printers as will now be described.

In most printing applications, the ratio of drops used for printing is small compared to total drops discharged from the print head so that most of the ink passing through the print heads 29*a* and 29*b* is collected by the catcher 33 and recirculated to the primary reservoir 1. Due to the exposure of these captured ink drops to air, it is inevitable that air molecules will be carried into the captured ink reservoir and that air, or gas, will be entrapped in the ink recirculated to the primary reservoir 1.

If this gas is not removed from the ink supply, or stabilized in the ink, drop formation at the heads 29*a*, 29*b* is adversely affected and a controlled, uniform and regular stream of ink drops is not realized. Hence, this air must either be removed or its effect minimized in some way. The low pressure/high pressure differential of the reservoirs 1, 9 accomplishes this purpose.

Due to the low pressure condition of reservoir 1, the majority of the entrapped air, or gas, is drawn out of the liquid ink in this primary reservoir 1. The remaining air, or gas, is transported with the ink to the intermediate reservoir 9 wherein it is subjected to a higher pressure condition. A fluid, such as ink, can hold more air, or gaseous products, in solution at high pressure than at low pressure. That is, gas is more readily dissolved in the ink at higher pressure than at lower pressure. Consequently, air trapped in the intermediate reservoir 9 is absorbed in solution in a controlled manner, or dissolved in the pressurized ink. The ink exiting intermediate reservoir 9 through filter 11 has, thus, been made relatively stable. Filter 11 is a mesh filter and it entraps particles that may have been transported from the container 1, retaining them in intermediate reservoir 9.

The relatively stable ink from reservoir 9 flows from conduit 13 through conduits 15*a*, 15*b* and is supplied to metering pumps 17*a*, 17*b* under positive pressure. Pumps 17*a* and 17*b* are independently activated to provide increased pressure in the liquid ink which further stabilizes the gaseous content of the ink. by stabilizing the content of the gas in the ink, the operation of the metering pumps 17*a* and 17*b* is also stabilized so that an ink stream of constant velocity and pressure can be provided to the print heads. While prime pump 5 provides what might be characterized as "gross pressure" for the system, metering pumps 17*a*, 17*b* are intended to operate in a very precise manner to provide the desired ink jet velocity from print heads 29*a*, 29*b*. To ensure that the desired ink jet characteristics are obtained, the finely metered flow of stabilized ink is transported by metering pumps 17*a*, 17*b* through filter/pressure fluctuation dampers 20*a*, 20*b* before arriving at print heads 29*a*, 29*b*. The ink is filtered by fine mesh particulate filters 21*a*, 21*b* of the components 20*a*, 20*b*. These filters 21*a*, 21*b*, in addition, work with storage chamber volumes 22*a*, 22*b* and coiled capilary tubes 23*a*, 23*b* to dampen pressure fluctuations generated by metering pumps 17*a*, 17*b*. The stabilized liquid ink passes from the storage chambers 22*a*, 22*b*, through coiled capilary tubes 23*a*, 23*b* into the associated conduits 24*a*, 24*b*. Due to the action of the filters 21*a*, 21*b*, storage chambers 22*a*, 22*b*, and capilary tubes 23*a*, 23*b*, the ink is delivered at a substantially constant pressure from the filter/pressure fluctuation dampers 20*a*, 20*b* to the associated conduits 24*a*, 24*b*. The ink flows from conduits 24*a*, 24*b* through on/off control valves 25*a*, 25*b*, and through conduits 27*a*, 27*b* into print heads 29*a*, 29*b*. Inasmuch as the ink supply provided to print heads 29*a*, 29*b* is delivered at a constant pressure and desired velocity, the print heads 29*a*, 29*b* discharge a regular and uniform jet of ink drops. Ink drops not used for recording, or printing, are captured by catcher, or gutter 33, accumulated in captured ink reservoir 35, and drawn back to primary reservoir 1, through filter 39 due to the low pressure condition of primary reservoir 1 as previously described. Filter 39 captures gross particulate contaminants that may have been amalgamated with the ink during exposure to the external environment.

The present invention thus provides both a method and apparatus for processing a stable supply of ink through metering pumps 17*a*, 17*b* so that constant pressure and ink jet velocity are maintained at the print heads 29*a*, 29*b*.

One particularly beneficial aspect of the instant ink supply system is that it is self-priming. The use of prime pump 5 in series with one or more metering pumps 17*a*, 17*b* ensures that as long as either the prime pump 5 or one metering pump 17*a* or 17*b* is in a primed (no trapped air) condition, air will automatically be removed from all other pumps after a period of time in a flow condition.

The invention also ensures that all components of the system between, and including, primary pump 5 and print heads 29*a*, 29*b* are under positive pressure, with the primary reservoir 1 being maintained at a low pressure. Hence, the possibility of gaseous bubble growth between the prime pump and metering heads is virtually eliminated, and such air bubble growth is confined to the portion of the system between the catcher and the inlet to the prime pump. Note also that maintaining the system under positive pressure from the prime pump to the point head prevents air from being drawn into the ink supply in that portion of the system, minimizing the number of fittings potentially subject to air leaks. Furthermore, inasmuch as reservoir 1 is a conventional replaceable ink container, all foaming and gross entrapment of absorbed gases in the system is contained within a disposable container. Moreover, since the ink container 1 is replaced regularly due to the consumption of ink in the printing process, all accumulated gases are periodically removed from the system.

Note, finally, that while the embodiment disclosed is a two print head embodiment, obviously, in view of the above teachings, the invention would be applicable to a printing apparatus having any number of print heads.

Having disclosed the preferred embodiment of the ink supply system of the present invention, and the inventive method and apparatus employed therein, many modifications and variations would be obvious to one skilled in the art in view of its teachings. The invention, therefore, is intended to be limited only by the scope of the appended claims.

What is claimed is:

1. In liquid ink supply system for an ink jet printing apparatus which discharges ink drops from a print head toward a record receiving member, selectively utilizes some of said ink drops for printing desired symbols on said second receiving member, the remainder of said emitted ink drops not impinging upon said record receiving member, but being collected by a catcher means, said liquid ink supply system being provided with a primary reservoir for said ink, and conduit means for connecting said primary reservoir with said print head, the improvement comprising:

a first pump connected by said conduit means intermediate said primary reservoir and said print head;

an intermediate reservoir connected by said conduit means intermediate said first pump and said print head; and a second pump connected by said conduit means intermediate said intermediate reservoir and said print head.

2. The liquid ink supply system of claim 1, wherein said intermediate reservoir is maintained by said first pump at a higher pressure than said primary reservoir.

3. The liquid ink supply system of claim 2, wherein said primary reservoir comprises a removable ink container.

4. The liquid ink supply system of claim 1, wherein said second pump increases the pressure in said liquid ink.

5. The liquid ink supply system of claim 4, wherein said first pump comprises a prime pump and said second pump comprises a metering pump.

6. The liquid ink supply system of claim 1, further comprising a means for dampening pressure fluctuations in said liquid ink, said pressure fluctuation dampening means being connected by said conduit means intermediate said second pump and said print head.

7. The liquid ink supply system of claim 1, further comprising an on/off control valve connected by said conduit intermediate said second pump and said print head.

8. The liquid ink supply system of claim 1, wherein said catcher means is connected by conduit means to said primary reservoir, and wherein a low pressure condition in said primary reservoir caused by said first pump pumping liquid ink out of said primary reservoir causes said liquid ink collected by said catcher means to be drawn back to said primary reservoir.

9. In a liquid ink supply system for an ink jet printing apparatus which discharges ink drops from a print head toward a record receiving member, selectively utilizes some of said ink drops to print desired symbols on said record receiving member, the remainder of said emitted ink drops not impinging upon said record receiving member, but being collected by a catcher means, said liquid ink supply being provided with a primary reservoir for said ink, and conduit means for connecting said primary reservoir with said print head, a method of supplying ink to said print head, comprising the steps of:

pumping said liquid ink from said primary reservoir to an intermediate reservoir by a first pump means;

maintaining said intermediate reservoir at a higher pressure than said primary reservoir; and pumping said liquid ink from said intermediate reservoir to said print head by a second pump means.

10. The method of claim 9, wherein said liquid ink is supplied to said second pump under positive pressure and said second pump increases the pressure of said liquid ink.

11. The method of claim 9, further comprising the step of dampening pressure fluctuations in said liquid ink being pumped from said second pump means to said print head.

12. The method of claim 11 further comprising the step of supplying liquid ink collected by said catcher means to said primary reservoir.

* * * * *